US008002887B2

(12) United States Patent
Rainer et al.

(10) Patent No.: US 8,002,887 B2
(45) Date of Patent: *Aug. 23, 2011

(54) ECONOMICAL PROCESS OF MANUFACTURING VERY FINE CO-GROUND CALCIUM CARBONATE MATERIAL OF THE GCC AND PCC TYPE, OBTAINED PRODUCTS AND THEIR USES

(75) Inventors: Christian Rainer, Villach (AT); Michael Pohl, Villach (AT)

(73) Assignee: Omya Development AG, Oftringen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/220,592

(22) Filed: Jul. 25, 2008

(65) Prior Publication Data

US 2009/0044725 A1 Feb. 19, 2009

Related U.S. Application Data

(63) Continuation-in-part of application No. 11/992,116, filed as application No. PCT/IB2006/002649 on Sep. 12, 2006, now abandoned.

(30) Foreign Application Priority Data

Sep. 16, 2005 (EP) .................................... 05077111

(51) Int. Cl.
*C09C 1/02* (2006.01)
*C09C 3/04* (2006.01)
*C01F 11/18* (2006.01)
*D21H 19/38* (2006.01)

(52) U.S. Cl. ........... 106/464; 241/16; 241/21; 241/24.1; 423/430

(58) Field of Classification Search .................. 106/464; 423/430; 241/16, 21, 24.1
See application file for complete search history.

(56) References Cited

U.S. PATENT DOCUMENTS

| 5,292,365 | A | | 3/1994 | Delfosse |
| 5,879,442 | A | * | 3/1999 | Nishiguchi et al. ........... 106/464 |
| 2006/0292305 | A1 | * | 12/2006 | Skuse et al. .................. 427/361 |
| 2008/0308010 | A1 | | 12/2008 | Rainer et al. |
| 2009/0044725 | A1 | | 2/2009 | Rainer et al. |
| 2009/0298988 | A1 | | 12/2009 | Jacquemet et al. |
| 2010/0074827 | A1 | | 3/2010 | Rainer et al. |
| 2010/0075148 | A1 | | 3/2010 | Rainer et al. |

FOREIGN PATENT DOCUMENTS

| EP | 0 850 880 A1 | 7/1998 |
| JP | 0 6041463 | 2/1994 |
| WO | WO 01/70643 A2 | 9/2001 |
| WO | WO 2004/016566 A1 | 2/2004 |
| WO | WO 2004/059079 A2 | 7/2004 |
| WO | WO 2007/031868 A1 | 3/2007 |
| WO | WO 2007/031869 A1 | 3/2007 |
| WO | WO 2007/031870 A1 | 3/2007 |
| WO | WO 2007/077484 A2 | 7/2007 |

OTHER PUBLICATIONS

International Search Report dated Nov. 1, 2007 for PCT Application No. PCT/IB2006/002655.
Written Opinion of the International Searching Authority for PCT Application No. PCT/IB2006/002655.
Faber, et al. "Horizontal Mill Friendly Ceramic Media With Improved Efficiency" Paint and Coatings Industry Magazine; Apr. 2001, pp. 30-38.
Mühlmeier: Mahltechnik—Technische Info: Internet Citation, Jul. 2003.
International Search Report dated Nov. 1, 2007 for PCT Application No. PCT/IB2006/002655.
Written Opinion of the International Searching Authority for PCT Application No. PCT/IB2006/002655. Nov. 1, 2007.

* cited by examiner

*Primary Examiner* — Anthony J Green
(74) *Attorney, Agent, or Firm* — Amster, Rothstein & Ebenstein LLP

(57) ABSTRACT

An object of the present invention is to provide a process to obtain a calcium carbonate material comprising GCC and PCC, presenting a fraction of particles finer than 1 μm of greater than 80%, preferably of greater than 85%, more preferably of greater than 90%, and even more preferably of greater than 95%, and a specific surface area of less than 25 $m^2/g$, in a cost efficient manner, wherein GCC and PCC are co-ground, possibly with at least another mineral material. An other object of the present invention lies in the co-ground calcium carbonate material in the form of an aqueous suspension and in the form of a dry product. An other object of the present invention lies in the uses of such products in any sector making use of mineral material, and notably in the paper, paint and plastic industries.

78 Claims, No Drawings

ECONOMICAL PROCESS OF MANUFACTURING VERY FINE CO-GROUND CALCIUM CARBONATE MATERIAL OF THE GCC AND PCC TYPE, OBTAINED PRODUCTS AND THEIR USES

CROSS-REFERENCE TO RELATED APPLICATIONS

This is a continuation-in-part of U.S. application Ser. No. 11/992,116, filed Jun. 23, 2008, now abandoned, which is a U.S. national phase of PCT Application No. PCT/IB2006/002649, filed Sep. 12, 2006, and claims priority to European Application No. 05077111.2, filed Sep. 16, 2005, the contents of which is incorporated by reference herein.

It is an object of the present invention to provide a process to obtain a calcium carbonate material comprising GCC (ground calcium carbonate) and PCC (precipitated calcium carbonate). The material is appropriate for use in a number of domains, for example in the paper industry.

It is also an object of the present invention to provide a process to obtain a calcium carbonate material comprising GCC and PCC, presenting a fraction of particles finer than 1 µm of greater than 80%, preferably of greater than 85%, more preferably of greater than 90%, and even more preferably of greater than 95%, and a BET specific surface area of less than 25 m²/g.

When the fraction of particles finer than 1 µm is greater than 95%, the BET specific surface area is preferably less than 25 m²/g. When the fraction of particles finer than 1 µm is greater than 90%, greater than 85%, and greater than 80%, the BET specific surface area is preferably less than 20 m²/g, less than 18 m²/g, and less than 15 m²/g, respectively. Such a material leads to superior properties of paper coated with such a material, notably in terms of gloss.

It is also an object of the present invention to provide a process to obtain a calcium carbonate material comprising GCC and PCC, with the above mentioned granulometric characteristics, wherein GCC and PCC are co-ground, possibly with at least another mineral material.

Another object of the present invention lies in the co-ground calcium carbonate material (i.e.: aqueous mineral slurries containing the co-ground GCC and PCC and dry products containing the co-ground GCC and PCC) obtained through this process.

Another object of the present invention lies in the uses of such products in any sector making use of mineral material, and notably in the paper, paint and plastic industries.

Many types of minerals are used in the paper coating formulation for the paper industry. Clay has traditionally been used for this purpose due to its low cost relative to other mineral pigments.

Calcium carbonate ($CaCO_3$) is used as both a coating and filling pigment, and is notably known to improve some of the optical properties of the final product, such as gloss, opacity or brightness. Calcium carbonate can be of two types: ground or natural calcium carbonate referred to as GCC, and synthetic or precipitated calcium carbonate referred to as PCC.

Ground calcium carbonate is calcium carbonate obtained from natural sources, such as limestone, marble or chalk, and processed through a treatment such as grinding. Precipitated calcium carbonate is a synthesized material, generally obtained by precipitation following reaction of carbon dioxide and lime in an aqueous environment. This PCC may be rhombohedral and/or scalenohedral and/or aragonitic.

According to the needs of the man skilled in the art, this GCC or PCC may additionally be surface treated, for example with stearine.

For many years, there has been need to supply the skilled man in the art with mineral slurries comprising GCC and PCC, since it may be of interest that both be present in the paper coating formulations, in order to regulate more precisely the final properties of the coated paper. Publications referring to the use of both natural and precipitated calcium carbonate in the paper industry include, for instance, "PCC or GCC, factors determining calcium carbonate choice in alkaline conversion" (published following the Nov. 28, 1995 Pulp and Paper Annual Meeting) and "GCC vs. PCC as the primary filler for uncoated and coated wood-free paper" (Tappi Journal 2000, 83(5), pp 76): these publications refer to the properties of PCC/GCC blends for use in paper industry. In "Chalk: a calcium carbonate for the high-filled sheet" (TAPPI Proceedings, Apr. 5-8 1992, Papermakers Conference, Book 2, Opryland Hotel, Nashville Tenn., , TAPPI Press, pp. 515-520), the author suggests that drawbacks associated with PCC may be overcome by using this mineral in conjunction with other fillers, such as GCC. Finally, in "Coating structure with calcium carbonate pigments and its influence on paper and print gloss" (Pulp & Paper Canada, 2004, 105(9), pp. 43-46), the influence of different pigment blends including GCC and PCC on paper properties including gloss and print gloss is investigated. The Applicant underlines that these publications appear to belong to the technical background of the invention, since they attest to the need to obtain mixtures of GCC and PCC for use in paper industry. However, none of these publications teach or reveal the co-grinding of both GCC and PCC, and the further possibility to obtain a co-ground product to a given fraction of fines, which is one of the objects of the present invention.

With further reference to the need of the skilled man in the art to improve some of the final properties of the coated paper, there is also an additional need for the skilled man to improve some of the optical properties of the final product, such as gloss. Faced with this requirement, the skilled man in the art knows that the fineness of the mineral matters used in the paper coating formulation, is a criteria of main importance: the fineness of the mineral matter is largely connected with an improvement in the optical properties of the coated paper.

In this area, the skilled man in the art knows EP 0 894 836 which discloses a slurry consisting of water, commercially available dispersant which prevents the dissociation of agglomerated pigment in the slurry, and agglomerated carbonate-containing pigment with a particle size distribution in which 80-99% by weight are below 2 µm in size, 50-90% by weight are below 1 µm and 0-10% by weight are below 0.2 µm, a steepness factor (ratio of diameter at 50% by weight to diameter at 20% by weight) is of 1.5-2.0 and a porosity is of 45-65%. It is clearly that this invention deals solely with natural calcium carbonate of the calcite, marble and chalk-type; moreover, the invention lies in a dispersing process and does not teach the grinding of the abovesaid carbonate-containing pigment. US 2002 155 055 addresses the problem of reducing the width of particle size distribution of calcium carbonate compositions for use in paper, but is exclusively focused on ground calcium carbonate, as recognized by the inventors (see [0007]). The proposed solution lies in a process comprising the step of forming a dispersant-free aqueous suspension of natural calcium carbonate, wet-grinding the suspension to produce a calcium carbonate composition having steepness ratio (A) and aging the suspension at temperature below 35° C. to produce a calcium carbonate composition having steepness ratio (B) smaller than the ratio (A). In this document, the steepness factor is defined as the average diameter of the particles in the 75% mass divided by the average diameter of the particles in the 25% mass, when the size distribution is represented using a Sedigraph™.

There are also prior art documents which deal with the use of calcium carbonate of a single type or of both types (GCC and PCC blends), in conjunction with at least one another mineral matter (and notably kaolin), and disclosing some particular values for the steepness factor of each material and/or of the final blend. WO 2003/093 577 teaches that, in order to improve gloss, opacity, brightness and smoothness of paper, specific particulate pigments may be useful in the paper coating formulations. These pigments comprise a first component, which is PCC and a second component which is a processed particulate hydrous kaolin clay having a shape factor of at least 25 and a steepness of at least 20, or a first component, which is a PCC having a spherical particle shape and a second component which is a processed particulate hydrous kaolin clay having a shape factor at least 45, and a mean equivalent particle diameter of less than 0.5 µm, or a first component which is a PCC and a second component, which is a processed particulate hydrous kaolin clay having a shape factor less than 25. Moreover, WO 2002/016 509 teaches that to improve the optical properties of paper and printability of paper coatings, it is advantageous to use kaolin having a mean particle size of 0.7-3 µm and a shape factor of at least 60; this type of kaolin can used in combination with another filler such as talc, calcium sulfate and/or alkaline earth metal carbonate. Finally, WO 2000/066 510 teaches that pigment compositions comprising a blend of a fine kaolin produced from block kaolin clay, and a calcium carbonate which may be either GCC or PCC, wherein both particles have a median particle size less than 0.8 µm, and a steepness factor, defined as $100 \times d_{30}/d_{70}$, greater than 38, and wherein the kaolin/carbonate weight ratio is of 40/60, preferably of 50/50, can improve the optical properties and printability of coated paper. While the latter three documents refer to the use of blends of calcium carbonate (possibly of both the GCC and PCC type), and necessarily kaolin, which is not a requirement of the present invention, they do not teach nor reveal the possibility to co-grind PCC and GCC, or even to the possibility of co-grinding kaolin with at least one type of calcium carbonate mineral.

Closer from the scope of the present invention, there are also documents dealing with the use of mixtures of GCC and PCC, notably for use in paper formulations to enhance some of the optical properties of the coated paper. WO 2004/016 566 discloses a method for preparing a pigment composition consisting in mixing PCC having a median particle size by weight of less than 1.6 µm and a GCC having a median particle size by weight of less than 0.8 µm, in a weight ratio PCC to GCC of 3:2 to 1:9. It does not teach anything about an eventual fraction of fine particles obtained via the process according to the invention. Nevertheless, examples demonstrate clearly that the weight % of particles finer than 1 µm is largely lower than 50%.

DE 4 128 570 discloses a carbonate filler and pigment with specified particle shape and size for filling and coating paper, giving high opacity, degree of whiteness and filler content. Such carbonate filler and pigment have rhombohedral or round particle shape, a gradient factor (ratio of particle diameter in µm at 50/20 weight %) of 1.1-1.4, ratio R of % particles finer than 1 µm/% particles finer than 0.6 µm ranging from 8 to 19, and average statistic particle diameter ranging from 0.4 to 1.5 µm. This document also indicates that is possible to obtain a blend of calcium carbonate particles where 70%, and preferably 95% by dry weight are finer than 1 µm. Finally, WO 2004/059 079 discloses particulate pigment composition, useful in paper, comprising a first pigment which is ground calcium carbonate and a second pigment which is precipitated or ground calcium carbonate, the first and the second pigment having different size distribution steepness factors ($100 \times d_{30}/d_{70}$). More precisely, the claimed particulate pigment composition comprises two pigment components. The first comprises particulate GCC carbonate having a steepness factor of 30-45, and the second comprises PCC with a steepness factor of 55-75, and diameter of at most 0.5 µm, or GCC with a steepness factor of 40-55. Tests n° 10 and 13 carried out by the Applicant disclose a blend of calcium carbonates of both types where 87% by dry weight of the particles have a mean diameter lower than 1 µm.

Nevertheless, it clearly appears that these inventions are based on the mixing of both GCC and PCC calcium carbonate types: the skilled man encounters new problems. Finely ground PCC with a certain granulometry is commonly desired, said granulometry being achieved by grinding in dry and/or aqueous media. However, after this grinding step, it has been observed that the resulting fine PCC particles collapse and must subsequently be de-agglomerated (processes in order to de-agglomerate such finely ground PCC are notably disclosed in JP 2001 089 505, JP 56 104 713, U.S. Pat. Nos. 6,143,065 or 5,279,663) by mechanical means and/or by the addition of de-agglomerating agents: this addition step represents an additional expense in the PCC production process; there is a need to perform this de-agglomeration step in a cost-efficient manner. Finally, when co-grinding GCC and PCC as opposed to separately grinding each component prior to blending, in particular when using the specific ceria ($CeO_2$)-containing beads described hereafter, a surprising increase in grinding efficiency (decrease in total specific energy required to obtain the final products with a desired fraction of particles finer than a given value) has been observed.

As indicated above, there is a need to provide the skilled man in the art with mineral slurries comprising both GCC and PCC for use in paper manufacturing, and in a cost efficient way in order to avoid, notably, the additional costly step of de-agglomerating PCC as necessary in the case of simply mixing of GCC and PCC.

Via the present invention, a new process of manufacturing a mineral slurry comprising both GCC and PCC, without the drawbacks present in the prior art, has surprisingly been found.

This process lies in a process for the preparation of co-ground calcium carbonate material of the GCC and PCC type, presenting a fraction of particles finer than 1 µm of greater than 80%, preferably of greater than 85%, more preferably of greater than 90%, and even more preferably of greater than 95%, and a BET specific surface area of less than 25 m²/g.

When the fraction of particles finer than 1 µm is greater than 95%, the BET specific surface area is preferably less than 25 m²/g. When the fraction of particles finer than 1 µm is greater than 90%, greater than 85%, and greater than 80%, the BET specific surface area is preferably less than 20 m²/g, less than 18 m²/g, and less than 15 m²/g, respectively.

It is of note that generally, a comparable GCC ground to a fraction of particles finer than 1 µm leads to a BET specific surface area of greater than 25 m²/g.

More precisely, the invention lies in a process of manufacturing a co-ground calcium carbonate material comprising GCC and PCC, presenting:

a fraction of particles finer than 1 µm of greater than 80%, preferably of greater than 85%, more preferably of greater than 90%, and even more preferably of greater than 95%, and a BET specific surface area of less than 25 m²/g.

said process being characterised in that it comprises the steps of:

(a) providing at least one calcium carbonate material, optionally in the form of an aqueous suspension, (b) co-grinding GCC and PCC, optionally with at least another mineral material, (c) optionally screening and/or upconcentrating the co-ground calcium carbonate material obtained following step (b), (d) optionally drying the co-ground calcium carbonate material obtained following step (b) or (c)

This process allows the skilled man in the art to obtain aqueous slurry and/or dry product comprising both GCC and PCC, which may notably be used in paper industry.

Moreover, and due to the specific fraction of particles finer than 1 µm, and due to the specific selection of BET specific surface area, high gloss properties are achieved in the coated paper. Lastly, it has surprisingly been found that following the co-grinding step, significant additional PCC de-agglomeration is no longer necessary: as such, the process according to the invention is less expensive than processes of the prior art based on the simple mixing of both GCC and PCC, which requires a first de-agglomeration of PCC. Finally, when co-grinding GCC and PCC as opposed to separately grinding each component prior to blending, in particular when using the specific ceria-containing beads described hereafter, a surprising increase in grinding efficiency (decrease in total specific energy required to obtain the final products with the desired fraction of fines) has been observed.

The Applicant would like also to mention EP 0 850 880, which discloses an aqueous slurry or dehydrated wet cake with a 25-75% solids concentration comprising a mixture of PCC and a viscosity reducing agent which is dispersed in a mixer to give a slurry with a viscosity below 1000 cp (at 25° C.), and which comprises 0.2-3 µm median diameter calcium carbonate particles. The slurry is then admixed with 1.5-30 µm median diameter dry ground calcium carbonate particles to give a weight ratio of (II) of 20:80 to 80:20 and a solids concentration of 60-85%. The slurry is next dispersed in a mixer to a viscosity below 1000 cp and finally dispersed in a sand grinding mill to give a product aqueous slurry comprising 0.2-2 µm median diameter calcium carbonate particles. This patent also mentions that the obtained calcium carbonate particles have a BET specific surface area in the range of 5 to 25 m2/g. The EP 0 850 880 patentee teaches the above process as a solution to counter the high shear rheology difficulties encountered when the GCC component is wet ground, which is a technical problem different than the one solved by the present invention. By contrast, in the present invention, it has firstly been found that a wet grinding is also acceptable without a loss of gloss. Furthermore, the patentee makes no reference to any gain in production process energy via this process that necessitates a dry grinding of GCC. Finally, this patent does not teach that the combination of a desirable fraction of fines and of a desirable BET specific surface area can be reached for gloss improvement by an energetically economic process.

A first object of the invention consists in a process of manufacturing a co-ground calcium carbonate material comprising GCC and PCC, presenting:

a fraction of particles finer than 1 µm of greater than 80%, preferably of greater than 85%, more preferably of greater than 90%, and even more preferably of greater than 95%, and a BET specific surface area of less than 25 m²/g said process being characterised in that it comprises the steps of:

(a) providing at least one calcium carbonate material, optionally in the form of an aqueous suspension, (b) co-grinding GCC and PCC, optionally with at least another mineral material, (c) optionally screening and/or upconcentrating the co-ground calcium carbonate material obtained following step (b), (d) optionally drying the co-ground calcium carbonate material obtained following step (b) or (c).

When the fraction of particles finer than 1 µm is greater than 95%, the BET specific surface area is preferably less than 25 m²/g. When the fraction of particles finer than 1 µm is greater than 90%, greater than 85%, and greater than 80%, the BET specific surface area is preferably less than 20 m²/g, less than 18 m²/g, and less than 15 m²/g, respectively.

The process according to the invention is characterised in that in step (a), the calcium carbonate material is provided as an aqueous suspension, and in that this aqueous suspension contains from 20 to 80% by dry weight of calcium carbonate, preferably from 50 to 75%, and most preferably from 50 to 70%. Said aqueous suspension may result from the dispersion of calcium carbonate material in the form of a wet cake.

According to this specific embodiment, the process according to the invention is also characterised in that the calcium carbonate material provided in the form of an aqueous suspension is GCC.

In this particular embodiment, the wet ground natural calcium carbonate may be subjected to a wet beneficiation step prior to step (b), allowing the removal of impurities, such as silicate impurities, for instance by froth flotation.

In another embodiment, the process according to the invention is also characterised in that step (c) is carried out.

In another embodiment, the process according to the invention is also characterised in that step (d) is carried out.

More generally, the process according to the invention is also characterised in that the co-grinding of GCC and PCC during step (b) is conducted in aqueous medium, wherein the concentration of calcium carbonate ranges from 20 to 80% (by dry weight of calcium carbonate), preferably from 50 to 75%, and most preferably from 50 to 70%.

The process according to the invention is also characterised in that at least one dispersing and/or grinding aid agent present in a weight % relative to the total dry mineral material ranging from 0 to 2%, preferably from 0.2 to 1.4%, and most preferably from 0.5 to 1.2% may be added before, during or after co-grinding in step (b). Such additives may be added to obtain a stable Brookfield™ viscosity of less than 3000 mPa.s, preferably of less than 1000 mPas, as measured at 25° C.

The skilled man in the art will choose the dispersing and/or grinding aid agent as a function of the properties he wishes to achieve. He can use, for instance, homopolymers of (meth) acrylic acid and/or copolymers of (meth)acrylic acid in combination with other water soluble monomers, such homo- and copolymers, which are totally or partially neutralised.

The process according to the invention is also characterised in that the co-grinding of GCC and PCC during step (b) is conducted in the presence of at least another mineral material selected from among talc, clay, $Al_2O_3$, $TiO_2$ or mixtures thereof.

More preferably, the other mineral material is selected among from talc, clay or mixtures thereof.

Most preferably, the other mineral material is talc or clay.

The process according to the invention is also characterised in that the co-grinding of GCC and PCC during step (b) occurs at a pH of above 7.

In another embodiment, the process according to the invention is characterised in that the co-grinding of GCC and PCC during step (b) occurs at a pH of above 10.

In another embodiment, the process according to the invention is characterised in that the co-grinding of GCC and PCC during step (b) occurs at a pH of above 11.

This pH increase can be the result of, for example, one or more of the following: by the addition of a base, preferably of a mono or divalent cation, most preferably of sodium or calcium, by the addition of an alkaline preparation of a biocide, or by the release of hydroxide, such a $Ca(OH)_2$, during grinding of a material, such as during the co-grinding of PCC and GCC. The Applicant indicates that he knows of French patent application number 05 00779, not yet published at the date of filing of the present patent application, which mentions biocides that may be added during the grinding step (b).

The process according to the invention is also characterised in that the grinder contents are subject to a temperature rise to above 60° C., preferably to above 90° C., and most preferably to above 100° C.

This temperature refers to the temperature reached by the mill contents at any one point in the mill. In particular, the mill contents at the mill base may be subject to a higher temperature as a result of a higher hydrostatic pressure.

The process according to the invention is also characterised in that the PCC present when co-grinding during step (b) accounts for 10 to 90% of the total combined PCC and GCC weight, preferably from 20 to 80% of the total combined PCC and GCC weight, and most preferably from 30 to 70% of the total combined PCC and GCC weight.

The process according to the invention is also characterised in that the co-grinding of GCC and PCC during step (b), is conducted in the presence of ceria-containing zirconium oxide grinding beads as grinding media, such beads having:
- a ceria content of between 14 and 20% by weight relative to the total weight of said bead, preferably of between 15 and 18% by weight relative to the total weight of said bead, and most preferably of approximately 16% by weight relative to the total weight of said bead; and
- an average grain size after sintering of the grains forming said beads of less than 1 μm, preferably of less than 0.5 μm, and most preferably of less than 0.3 μm.

This grain size is determined by analysis of scanning electron microscope images of the beads. Bead ceria content is analysed by ICP Optical Emission Spectrometry.

The process according to the invention is also characterised in that the beads have an original diameter prior to grinding of between 0.2 and 1.5 mm, preferably of between 0.4 and 1.0 mm.

Another object of the present invention lies in the co-ground calcium carbonate material comprising GCC and PCC, characterised in that it is obtained by the process according to the invention.

Another object of the present invention lies in calcium carbonate material comprising GCC and PCC, characterised in that it is in the form of an aqueous suspension, presenting:
- a fraction of particles finer than 1 μm of greater than 80%, preferably of greater than 85%, more preferably of greater than 90%, and even more preferably of greater than 95%, and
- a BET specific surface area of less than 25 $m^2/g$.

When the fraction of particles finer than 1 μm is greater than 95%, the BET specific surface area is preferably less than 25 $m^2/g$. When the fraction of particles finer than 1 μm is greater than 90%, greater than 85%, and greater than 80%, the BET specific surface area is preferably less than 20 $m^2/g$, less than 18 $m^2/g$, and less than 15 $m^2/g$, respectively.

According to the above embodiment, the co-ground calcium carbonate material in the form of an aqueous suspension is also characterised in that it contains 20 to 80% by dry weight of calcium carbonate material, preferably 40 to 75% by dry weight of calcium carbonate material, and most preferably 60 to 70% by dry weight of calcium carbonate material.

The co-ground calcium carbonate material in the form of an aqueous suspension is also characterised in that the PCC present accounts for 10 to 90% of the total combined PCC and GCC weight, preferably from 20 to 80% of the total combined PCC and GCC weight, and most preferably from 30 to 70% of the total combined PCC and GCC weight.

The co-ground calcium carbonate material comprising GCC and PCC and in the form of an aqueous suspension according to the invention is also characterised in that it presents a steepness factor of at least about 30, preferably of at least about 40, and most preferably of at least about 45.

The steepness factor is defined as $d_{30}/d_{70} \times 100$, where $d_x$ is the equivalent spherical diameter relative to which x % by weight of the particles are finer.

The co-ground calcium carbonate material comprising GCC and PCC and in the form of an aqueous suspension according to the invention is also characterised in that it features a $d_{50}$ from about 0.2 to about 2 μm, preferably from 0.2 to 0.8 μm, and most preferably from about 0.25 to about 0.45 μm. This $d_{50}$ is measured using a Sedigraph™ 5100.

The co-ground calcium carbonate material comprising GCC and PCC and in the form of an aqueous suspension according to the invention is also characterised in that the aqueous suspension contains at least one dispersing and/or grinding aid agent, such dispersing and/or grinding aid agent being present in a weight % relative to the total dry mineral material ranging from 0 to 2%, preferably from 0.2 to 1.4%, and most preferably from 0.5 to 1.2%.

The co-ground calcium carbonate material comprising GCC and PCC and in the form of an aqueous suspension according to the invention is also characterised in that the slurry water passed through a 40 μm sieve contains less than 1000 ppm of $ZrO_2$ and less than 200 ppm $CeO_2$.

The co-ground calcium carbonate material comprising GCC and PCC and in the form of an aqueous suspension according to the invention is also characterised in that the slurry water features a $ZrO_2/CeO_2$ weight ratio of 4 to 6.5, preferably of 4.6 to 5.7, and most preferably of 5.3. ZrO2 and CeO2 contents are determined by ICP-OES.

Another object of the present invention lies in the co-ground calcium carbonate material comprising GCC and PCC, characterised in that it is in the form of a dry product, presenting:
- a fraction of particles finer than 1 μm of greater than 80%, preferably of greater than 85%, more preferably of greater than 90%, and even more preferably of greater than 95%, and
- a BET specific surface area of less than 25 $m^2/g$.

When the fraction of particles finer than 1 μm is greater than 95%, the BET specific surface area is preferably less than 25 $m^2/g$. When the fraction of particles finer than 1 μm is greater than 90%, greater than 85%, and greater than 80%, the BET specific surface area is preferably less than 20 $m^2/g$, less than 18 $m^2/g$, and less than 15 $m^2/g$, respectively.

The co-ground calcium carbonate material comprising GCC and PCC and in the form of a dry product according to the invention is also characterised in that the PCC present accounts for 10 to 90% of the total combined PCC and GCC weight, preferably from 20 to 80% of the total combined PCC and GCC weight, and most preferably from 30 to 70% of the total combined PCC and GCC weight.

The co-ground calcium carbonate material comprising GCC and PCC and in the form of a dry product according to the invention is also characterised in that it presents a steepness factor of at least about 30, preferably of at least about 40, and most preferably of at least about 45.

The co-ground calcium carbonate material comprising GCC and PCC and in the form of a dry product according to the invention is also characterised in that it features a $d_{50}$ from about 0.2 to about 2.0 µm, preferably from 0.2 to 0.8 µm, and most preferably from about 0.25 to about 0.45 µm.

The co-ground calcium carbonate material comprising GCC and PCC and in the form of a dry product according to the invention is also characterised in that the it features a $ZrO_2/CeO_2$ weight ratio of from 4 to 6.5, preferably of from 4.6 to 5.7, and most preferably of 5.3.

Finally, another object of the present invention lies in the uses of the co-ground calcium carbonate material according to the invention, in any sector making use of mineral material, and notably in the paper, paint and plastic industries.

EXAMPLES

The following examples are intended to illustrate certain embodiments of the invention and are non-limitative.

Median diameter was measured using Sedigraph™ 5100.

Example 1

Comparative Example

Ground calcium carbonate presenting a median diameter of 1.5 µm was wet-ground at a solids content of 74.5% in the presence of the following additives: 1.51% sodium polyacrylate, in a two-pass process using ceria-comprising zirconium oxide grinding beads featuring a median bead diameter of 0.45 mm, a $CeO_2$ content of 16% by weight relative to the total bead weight, and a grain size after sintering of 0.4 µm. The specific grinding energy required to obtain a final GCC with a fraction of particles less than 1 µm of 97% for this material was of 270 kWh/t.

The obtained slurry of the ground GCC material featuring a subsequently diluted solids content of 75% was then added to a standard paper coating formulation made up of the following proportions of components:

| | |
|---|---|
| 100 parts | ground GCC material |
| 10.5 parts | SBR latex |
| 0.5 parts | synthetic thickener |
| 0.2 parts | polyvinyl alcohol |
| 0.2 parts | optical brightening agent |

The above coating was adjusted to a final solids content of 68% and applied on a standard pre-coated wood-free base paper with a grammage of 71 g/m² at a coat weight of 10 g/m²/side. This coated base paper was then calendered using a supercalender under the following calendering conditions: calender speed of 800 m/min, calender load of 200 kN/cm and a temperature of 105° C.

The gloss of the coated paper surface was of 70% Tappi 75°.

Example 2

Illustration of the Process According to the Invention

A 76% solids content slurry of ground calcium carbonate presenting a median GCC diameter of 1.4 µm was ground in the presence of a 51% solids content PCC slurry with a median PCC diameter of 0.75 µm. The PCC to GCC weight ratio in the mill was of 50:50. The total solids content of the slurry in the mill was of 61% and a median diameter of 1.1. The grinder contents were then co-ground in the presence of the following total additives content: 0.95 wt % sodium polyacrylate, using ceria-comprising zirconium oxide grinding beads featuring a median bead diameter of 0.45 mm, a CeO2 content of 16% by weight relative to the total bead weight, and a grain size after sintering of 0.4 µm. The specific grinding energy required to obtain a final co-ground GCC with a fraction of particles less than 1 µm of 97% for this material was of 200 kWh/t.

The obtained slurry of the co-processed material featuring a solids content of 70.2% was then added to a standard paper coating formulation made up of the following weight proportions of components:

| | |
|---|---|
| 100 parts | co-processed material |
| 10.5 parts | SBR latex |
| 0.5 parts | synthetic thickener |
| 0.2 parts | polyvinyl alcohol |
| 0.2 parts | optical brightening agent |

The above coating was adjusted to a final solids content of 68% and applied on a standard pre-coated wood-free base paper with a grammage of 71 g/m² at a coat weight of 10 g/m²/side. This coated base paper was then calendered using a supercalender under the following calendering conditions: calender speed of 800 m/min, calender load of 200 kN/cm and a temperature of 105° C.

The gloss of the coated paper surface was of 72% Tappi 75°.

The above results are summarised in Table 1.

TABLE 1

| | | |
|---|---|---|
| Fraction of particles finer than 1 µm in the final ground product | 97% | 97% |
| BET specific surface area of the final ground product | 28 g/m² | 23 g/m² |
| Steepness factor of the final ground product | 35 | 42 |
| Median diameter of the final ground product | 0.27 µm | 0.27 µm |
| Tappi gloss of paper coated with a formulation comprising the product | 70% | 72% |
| Brightness of paper coated with a formulation comprising the product | 95.1% | 96.5% |
| Opacity of paper coated with a formulation comprising the product | 89.7% | 90.2% |

Table 1 illustrates that the process according to the invention requires less grinding energy to obtain the desired fraction of particles finer than a given value, which leads to an equal/improved gloss, relative to a process of the prior art.

Example 3

Comparative Example

This example illustrates a blend of PCC and GCC, in which each component is first separately ground prior to being mixed.

A 48% solids aqueous slurry of PCC starting material having the characteristics indicated under Example 3 in Table 2 was ground in a media mill using yttrium-stabilised zirconium silicate grinding beads featuring a bead diameter prior to grinding of 0.6 to 1.0 mm. A total of 50 kWh/t specific grinding energy was expended in order to obtain a PCC end material having the end material characteristics indicated in Table 2. The final solids content of this subsequently upconcentrated PCC slurry was of 68%.

Separately, a 74% solids aqueous slurry of GCC starting material having the characteristics indicated under Example 3 in Table 2 was ground in a media mill using yttrium-stabilised zirconium silicate grinding beads featuring a bead diameter prior to grinding of 0.6 to 1.0 mm. A total of 210 kWh/t specific grinding energy was expended in order to obtain a GCC end material having the end material characteristics indicated in Table 2.

The final solids content of this GCC slurry was of 75%.

The PCC and GCC slurries were then mixed so as to obtain a PCC/GCC blend material with a PCC:GCC weight ratio of 30:70. This slurry was then added to a standard paper coating formulation made up of the following weight proportions of component:

| | |
|---|---|
| 100 parts | PCC/GCC blend material |
| 10.5 parts | SBR latex |
| 0.5 parts | synthetic thickener |
| 0.2 parts | polyvinyl alcohol |
| 0.2 parts | optical brightening agent |

The above coating was adjusted to a final solids content of 68% and applied on a standard pre-coated wood-free base paper with a grammage of 71 g/m2 at a coat weight of 10 g/m2/side. This coated base paper was then calendered using a supercalender under the following calendering conditions: calender speed of 800 m/min, calender load of 200 kN/cm and a temperature of 105° C.

The optical properties of the coated paper surface are given in Table 2.

Example 4

Example According to the Invention

This example illustrates a co-ground PCC and GCC obtained by a process according to the invention.

A 74% solids content slurry of ground calcium carbonate presenting the characteristics listed under Example 4 in Table 2 was ground in the presence of a 48% solids content PCC slurry with the characteristics listed under Example 4 in Table 2 in a media mill. The PCC to GCC weight ratio in the mill was of 30:70 and the solids content of 65.9%. The grinder contents were co-ground using yttrium-stabilised zirconium silicate grinding beads featuring a bead diameter prior to grinding of 0.6 to 1.0 mm. A total of 116 kWh/t specific grinding energy was expended in order to obtain a GCC/PCC co-ground end material having the end material characteristics indicated in Table 2. The final solids content of this GCC slurry was of 70.3%.

This slurry was then added to a standard paper coating formulation made up of the following weight proportions of components:

| | |
|---|---|
| 100 parts | PCC/GCC co-ground material |
| 10.5 parts | SBR latex |
| 0.5 parts | synthetic thickener |
| 0.2 parts | polyvinyl alcohol |
| 0.2 parts | optical brightening agent |

The above coating was adjusted to a final solids content of 68% and applied on a standard pre-coated wood-free base paper with a grammage of 71 g/m² at a coat weight of 10 g/m²/side. This coated base paper was then calendered using a supercalender under the following calendering conditions: calender speed of 800 m/min, calender load of 200 kN/cm and a temperature of 105° C.

The optical properties of the coated paper surface are given in Table 2.

TABLE 2

| Product Name | | Example 3: PCC/GCC Blend Material | Example 4: PCC/GCC Co-Ground Material |
|---|---|---|---|
| Starting material characteristics | | | |
| GCC | $d_{50}$ (µm) | 1.4 | 1.4 |
| | Steepness factor | 28 | 28 |
| PCC | $d_{50}$ (µm) | 0.75 | 0.75 |
| | Steepness factor | 55 | 55 |
| End material characteristics | | | |
| GCC | $d_{50}$ (µm) | 0.40 | — |
| | Steepness factor | 34 | — |
| PCC | $d_{50}$ (µm) | 0.38 | — |
| | Steepness factor | 40 | — |
| PCC/GCC | PCC/GCC weight | 30/70 | 30/70 |
| | $d_{50}$ (µm) | 0.38 | 0.40 |
| | Steepness factor | 37 | 38 |
| | Fraction of particles with a diameter less than 2 µm (%) | 89.5 | 88.8 |
| | BET specific surface area (g/m²) | 18.1 | 18.2 |
| Total specific grinding energy | | 162 kWh/t | 116 kWh/t |
| Characteristics of paper coated with the end material | | | |
| Paper gloss (Tappi 75°) | | 70.5% | 72% |
| Opacity | | 90.4% | 90.5% |
| Brightness R457 | | 97.9% | 97.9% |

Table 2 indicates that the process to prepare a co-ground PCC/GCC material according to the invention requires less grinding energy as compared to that required to prepare a comparable blend of PCC and GCC, without any loss or with an improvement in optical properties.

Example 5

This example illustrates the use of a process according to the invention wherein 3 minerals, a natural calcium carbonate, a precipitated calcium carbonate and a clay, are co-ground with the use of ceria-containing zirconium oxide grinding beads with a ceria content of 16% by weight relative to the total weight of said bead, an average grain size after sintering of the grains forming said bead of 0.4 µm, and a median bead diameter of 0.45 mm. The co-ground material is then added to a coating formulation used to coat a base paper, and the resulting gloss is measured.

The following materials were co-ground:
- a 74% solids content slurry of ground calcium carbonate presenting a median GCC diameter of 1.4 μm and prepared using 0.27% weight (by weight of dry GCC) of an homopolymer of acrylic acid,
- a 51% solids content PCC slurry with a median PCC diameter of 0.8 μm and prepared using 0.7% weight (by dry weight of PCC) of an homopolymer of acrylic acid,
- and a 68% solids content slurry of clay commercialized by HUBER™ under the name Lithoprint™.

The weight ratio PCC:GCC:clay in the mill was of 45:45:10.

The total solids content of the slurry in the mill was of 72% and the median diameter was of 0.4 and 0.5 μm for the 2 tests illustrating the invention.

The grinder contents were then co-ground in the presence of the following total additives content:
- respectively 0.4 and 0.2 weight % (by dry weight of mineral matter) of an homopolymer of acrylic acid, where 14 mol % of the carboxylic functions are neutralized by sodium hydroxyde, having a molecular weight of 5 600 g/mol, and a polydispersity equal to 2.4,
- using ceria-comprising zirconium oxide grinding beads featuring a median bead diameter of 0.45 mm, a CeO2 content of 16% by weight relative to the total bead weight, and a grain size after sintering of 0.45 μm, leading to a coground material exhibiting a median diameter respectively of 0.4 and 0.5 μm.

The 2 obtained slurry of the co-processed material was then added to a standard paper coating formulation made up of the following weight proportions of components:
100 parts co-processed material
11 parts SBR latex (DL 966 commercialized by DOW CHEMICALS™)
0.5 parts synthetic thickener (CMC FF5 commercialized by FINNFIX™)
0.4 parts polyvinyl alcohol (PVA 4-98 commercialized by CLARIANT™)
0.6 parts optical brightening agent (Blancophor™ P commercialized by BAYER™)

The above coating was applied on a standard topcoat base paper with a grammage of 78 g/m² at a coat weight of 10 g/m²/side. This coated base paper was then calendered using a supercalender under the following calendering conditions: calender speed of 300 m/min, calender load of 170 kN/m and a temperature of 80°C.

For the coground material exhibiting a median diameter of 0.4 μm, the gloss of the coated paper surface was of 73% Tappi 75° and 45% DIN 75°. By comparison, the same coating manufactured with 100 parts of a GCC having a median diameter of 0.4 μm was of 70% Tappi 75° and 35% DIN 75°.

For the coground material exhibiting a median diameter of 0.5 μm, the gloss of the coated paper surface was of 68% Tappi 75° and 40% DIN 75°. By comparison, the same coating manufactured with 100 parts of a GCC having a median diameter of 0.4 μm was of 63% Tappi 75° and 33% DIN 75°.

The invention claimed is:

1. A process of manufacturing a co-ground calcium carbonate material comprising GCC and PCC, said process comprising the steps of:
    (a) providing GCC in an aqueous suspension,
    (b) co-grinding the aqueous suspension of GCC and an aqueous suspension of PCC, optionally with at least another mineral material,
    (c) optionally screening and/or upconcentrating the co-ground calcium carbonate material obtained following step (b),
    (d) optionally drying the co-ground calcium carbonate material obtained following step (b) or (c),
wherein the material obtained from step (b) is characterized as having greater than 95% particles finer than 1 μm and a BET specific surface area less than 25 m²/g.

2. The process according to claim 1, wherein the material obtained from step (b) is characterized as having a BET specific surface area less than 20 m²/g.

3. The process according to claim 1, wherein the material obtained from step (b) is characterized as having BET specific surface area less than 18 m²/g.

4. The process according to claim 1, wherein the material obtained from step (b) is characterized as having a BET specific surface area less than 15 m²/g.

5. The process according to claim 1, wherein in step (a), the GCC is provided as an aqueous suspension having a solids content from 20 to 80%.

6. The process according to claim 1, wherein in step (a), the GCC is provided as an aqueous suspension having a solids content of from 50 to 75%.

7. The process according to claim 1, wherein in step (a), the GCC is provided as an aqueous suspension having a solids content of from 50 to 70%.

8. The process according to claim 1, wherein step (c) is carried out.

9. The process according to claim 1, wherein step (d) is carried out.

10. The process according to claim 1, wherein the co-grinding of GCC and PCC during step (b) is conducted in an aqueous medium at a calcium carbonate concentration of 20 to 80% by dry weight of calcium carbonate.

11. The process according to claim 1, wherein the co-grinding of GCC and PCC during step (b) is conducted in an aqueous medium at a calcium carbonate concentration of 50 to 75% by dry weight of calcium carbonate.

12. The process according to claim 1, wherein the co-grinding of GCC and PCC during step (b) is conducted in an aqueous medium at a calcium carbonate concentration of 50 to 70% by dry weight of calcium carbonate.

13. The process according to claim 1, wherein 0 to 2% by weight of at least one dispersing and/or grinding aid agent relative to total dry mineral material is added before, during or after step (b).

14. The process according to claim 1, wherein 0.2 to 1.4% by weight of at least one dispersing and/or grinding aid agent relative to total dry mineral material is added before, during or after step (b).

15. The process according to claim 1, wherein 0.5 to 1.2% by weight of at least one dispersing and/or grinding aid agent relative to total dry mineral material is added before, during or after step (b).

16. The process according to claim 1, wherein the co-grinding of GCC and PCC during step (b) is conducted in the presence of at least another mineral material selected from talc, clay, $Al_2O_3$, $Ti_2O_2$ or mixtures thereof.

17. The process according to claim 1, wherein the co-grinding of GCC and PCC during step (b) is conducted in the presence of at least another mineral material selected among from talc, clay or mixtures thereof.

18. The process according to claim 1, wherein the co-grinding of GCC and PCC during step (b) is conducted in the presence of talc.

19. The process according to claim 1, wherein the co-grinding of GCC and PCC during step (b) is conducted in the presence of clay.

20. The process according to claim 1, wherein the co-grinding of GCC and PCC during step (b) occurs at pH of above 7.

21. The process according to claim 1, wherein the co-grinding of GCC and PCC during step (b) occurs at a pH of above 10.

22. The process according to claim 1, wherein the co-grinding of GCC and PCC during step (b) occurs at a pH of above 11.

23. The process according to claim 1, wherein the GCC and PCC in step (b), during grinding is, subjected to a temperature rise to above 60° C.

24. The process according to claim 1, wherein the GCC and PCC in step (b), during grinding, is subjected to a temperature rise to above 90° C.

25. The process according to claim 1, wherein the GCC and PCC in step (b), during grinding, is subjected to a temperature rise to above 100° C.

26. The process according to claim 1, wherein the weight of PCC relative to total weight of GCC and PCC is from 10 to 90%.

27. The process according to claim 1, wherein the weight of PCC relative to total weight of GCC and PCC is from 20 to 80%.

28. The process according to claim 1, wherein the weight of PCC relative to total weight of GCC and PCC is from 30 to 70%.

29. The process according to claim 1, wherein the co-grinding of GCC and PCC during step (b) is conducted in the presence of ceria-containing zirconium oxide grinding beads as grinding media, such beads having:
    a ceria content of between 14 and 20% by weight relative to the total weight of said beads; and
    an average grain size after sintering of grains forming said beads of less than 1.0 μm.

30. The process according to claim 29, wherein the beads have a ceria content of between 15 and 18% by weight relative to the total weight of said beads.

31. The process according to claim 29, wherein the beads have a ceria content of approximately 16% by weight relative to the total weight of said beads.

32. The process according to claim 29, wherein the beads have an average grain size after sintering of grains forming said beads of less than 0.5 μm.

33. The process according to claim 29, wherein the beads have an average grain size after sintering of grains forming said beads of less than 0.3 μm.

34. The process according to claim 29, wherein the beads have an original diameter prior to grinding of between 0.2 and 1.5 mm.

35. The process according to claim 29, wherein the beads have an original diameter prior to grinding of between 0.4 and 1.0 mm.

36. Co-ground calcium carbonate material comprising GCC and PCC, characterized in that it is obtained by the process according to claim 1.

37. Paper, paints or plastics comprising the co-ground calcium carbonate material according to claim 36.

38. Co-ground calcium carbonate material comprising GCC and PCC, characterized in that it is in the form of an aqueous suspension, wherein the material has :
    greater than 95% particles finer than 1 μm, and
    a BET specific surface area of less than 25 $m^2/g$.

39. The co-ground calcium carbonate material according to claim 38, wherein the material has a BET specific surface area less than 20 $m^2/g$.

40. The co-ground calcium carbonate material according to claim 38, wherein the material has a BET specific surface area less than 18 $m^2/g$.

41. The co-ground calcium carbonate material according to claim 38, wherein the material has a BET specific surface area less than 15 $m^2/g$.

42. The co-ground calcium carbonate material according to claim 38, characterized in that it contains from 20 to 80% by dry weight of calcium carbonate material.

43. The co-ground calcium carbonate material according to claim 38, characterized in that it contains from 40 to 75% by dry weight of calcium carbonate material.

44. The co-ground calcium carbonate material according to claim 38, characterized in that it contains from 60 to 70% by dry weight of calcium carbonate material.

45. The co-ground calcium carbonate material according to claim 38, wherein the weight of PCC relative to total weight of GCC and PCC is from 10 to 90%.

46. The co-ground calcium carbonate material according to claim 38, wherein the weight of PCC relative to total weight of GCC and PCC is from 20 to 80%.

47. The co-ground calcium carbonate material according to claim 38, wherein the weight of PCC relative to total weight of GCC and PCC is from 30 to 70%.

48. The co-ground calcium carbonate material according to claim 38, characterized in having a steepness factor of at least about 30.

49. The co-ground calcium carbonate material according to claim 38, characterized in having a steepness factor of at least about 40.

50. The co-ground calcium carbonate material according to claim 38, characterized in having a steepness factor of at least about 45.

51. The co-ground calcium carbonate material according to claim 38, characterized in having a d50 from about 0.2 to about 2.0 μm.

52. The co-ground calcium carbonate material according to claim 38, characterized in having a d50 from 0.2 to 0.8 μm.

53. The co-ground calcium carbonate material according to claim 38, characterized in having a d50 from about 0.25 to about 0.45 μm.

54. The co-ground calcium carbonate material according to claim 38, wherein the aqueous suspension contains 0 to 2% by weight of at least one dispersing and/or grinding aid agent relative to total dry mineral material.

55. The co-ground calcium carbonate material according to claim 38, wherein the aqueous suspension contains 0.2 to 1.4% by weight of at least one dispersing and/or grinding aid agent relative to total dry mineral material.

56. The co-ground calcium carbonate material according to claim 38, wherein the aqueous suspension contains 0.5 to 1.2% by weight of at least one dispersing and/or grinding aid agent relative to total dry mineral material.

57. The co-ground calcium carbonate material according to claim 38, wherein a slurry water of the aqueous suspension, after being passed through a 40 μm sieve, contains less than 1000 ppm of $ZrO_2$ and less than 200 ppm $CeO_2$.

58. The co-ground calcium carbonate material according to claim 38, wherein a slurry water of the aqueous suspension has a $ZrO_2/CeO_2$ weight ratio of 4 to 6.5.

59. The co-ground calcium carbonate material according to claim 38, wherein a slurry water of the aqueous suspension has a $ZrO_2/CeO_2$ weight ratio of 4.6 to 5.7.

60. The co-ground calcium carbonate material according to claim 38, wherein a slurry water of the aqueous suspension has a $ZrO_2/CeO_2$ weight ratio of 5.3.

61. Paper, paints or plastics comprising the co-ground calcium carbonate material according to claim 36.

62. Co-ground calcium carbonate material comprising GCC and PCC, characterized in that it is in the form of a dry product, wherein the material has:
greater than 95% particles finer than 1 μm, and
a BET specific surface area of less than 25 $m^2/g$.

63. The co-ground calcium carbonate material according to claim 62, wherein the material has a BET specific surface area less than 20 $m^2/g$.

64. The co-ground calcium carbonate material according to claim 62, wherein the material has a BET specific surface area less than 18 $m^2/g$.

65. The co-ground calcium carbonate material according to claim 62, wherein the material has a BET specific surface area less than 15 $m^2/g$.

66. The co-ground calcium carbonate material according to claim 62, wherein the weight of PCC relative to total weight of GCC and PCC is from 10 to 90%.

67. The co-ground calcium carbonate material according to claim 62, wherein the weight of PCC relative to total weight of GCC and PCC is from 20 to 80%.

68. The co-ground calcium carbonate material according to claim 62, wherein the weight of PCC relative to total weight of GCC and PCC is from 30 to 70%.

69. The co-ground calcium carbonate material according to claim 62, characterized in having a steepness factor of at least about 30.

70. The co-ground calcium carbonate material according to claim 62, characterized in having a steepness factor of at least about 40.

71. The co-ground calcium carbonate material according to claim 62, characterized in having a steepness factor of at least about 45.

72. The co-ground calcium carbonate material according to claim 62, characterized in having a d50 from about 0.2 to about 2.0 μm.

73. The co-ground calcium carbonate material according to claim 62, characterized in having a d50 from 0.2 to 0.8 pm.

74. The co-ground calcium carbonate material according to claim 62, characterized in having a d50 from about 0.25 to about 0.45 μm.

75. The co-ground calcium carbonate material according to claim 62, characterized in having a $ZrO_2.CeO_2$ weight ratio of 4 to 6.5.

76. The co-ground calcium carbonate material according to claim 62, characterized in having a $ZrO_2.CeO_2$ weight ratio of 4.6 to 5.7.

77. The co-ground calcium carbonate material according to claim 62, characterized in having a $ZrO_2.CeO_2$ weight ratio of 5.3.

78. Paper, paints or plastics comprising the co-ground calcium carbonate material according to claim 62.

* * * * *